United States Patent
Smith et al.

(10) Patent No.: US 7,158,248 B2
(45) Date of Patent: Jan. 2, 2007

(54) CONTROL OF SOFTWARE VIA BUNDLING

(75) Inventors: William Mark Smith, Boise, ID (US); John Leland Boldon, Emmett, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 10/072,000

(22) Filed: Feb. 7, 2002

(65) Prior Publication Data

US 2003/0149917 A1 Aug. 7, 2003

(51) Int. Cl.
*G06F 15/00* (2006.01)

(52) U.S. Cl. .................. 358/1.15; 709/203; 717/168

(58) Field of Classification Search ............. 358/1.15, 358/1.16, 3.23; 717/168, 169, 170, 171, 717/172, 173; 709/203
See application file for complete search history.

(56) References Cited

U.S. PATENT DOCUMENTS

| | | | |
|---|---|---|---|
| 5,845,090 A | 12/1998 | Collins, III et al. | |
| 5,956,487 A * | 9/1999 | Venkatraman et al. | 709/218 |
| 6,091,508 A * | 7/2000 | Love et al. | 358/1.15 |
| 6,094,679 A | 7/2000 | Teng et al. | |
| 6,130,757 A * | 10/2000 | Yoshida et al. | 358/1.15 |
| 6,282,711 B1 | 8/2001 | Halpern et al. | |
| 6,298,421 B1 * | 10/2001 | Minamizawa et al. | 711/151 |
| 6,467,087 B1 * | 10/2002 | Yang | 717/168 |
| 6,473,788 B1 * | 10/2002 | Kim et al. | 709/209 |
| 2001/0030755 A1 | 10/2001 | Yamade | |
| 2001/0054088 A1 | 12/2001 | Naito et al. | |
| 2002/0015066 A1 * | 2/2002 | Siwinski et al. | 347/19 |
| 2003/0051011 A1 * | 3/2003 | Schacht et al. | 709/221 |
| 2003/0066066 A1 * | 4/2003 | Nguyen et al. | 717/178 |

FOREIGN PATENT DOCUMENTS

| | | |
|---|---|---|
| EP | 0747790 | 12/1996 |
| EP | 0601704 | 3/1999 |
| JP | 2001067228 | 3/2001 |

* cited by examiner

*Primary Examiner*—Kimberly Williams
*Assistant Examiner*—Dillon Murphy

(57) ABSTRACT

A method of revising multi-component software in a multifunctional printer, including revising at least one software component of the multi-component software, qualifying the multi-component software, bundling the multi-component software as a software bundle; and loading the software bundle on to a multifunctional printer. Additional methods and/or devices are also included.

32 Claims, 7 Drawing Sheets

CONTROL OF SOFTWARE VIA BUNDLING

TECHNICAL FIELD

The subject matter disclosed herein relates to control of software for multifunctional devices, such as, but not limited to, multifunctional printers.

BACKGROUND

A need exists for methods and systems for controlling software, in particular, revisions to software on devices such as, but not limited to, printers.

SUMMARY

Methods and systems for developing, loading and/or revising software on multifunctional devices, including multifunctional printers and multifunctional devices for receiving bundled software.

BRIEF DESCRIPTION OF THE DRAWINGS

Various methods and/or devices are illustrated by way of example and not limitation in the figures of the accompanying drawings. The same numbers are used throughout the figures to reference like components and/or features.

DETAILED DESCRIPTION

Figure 1:
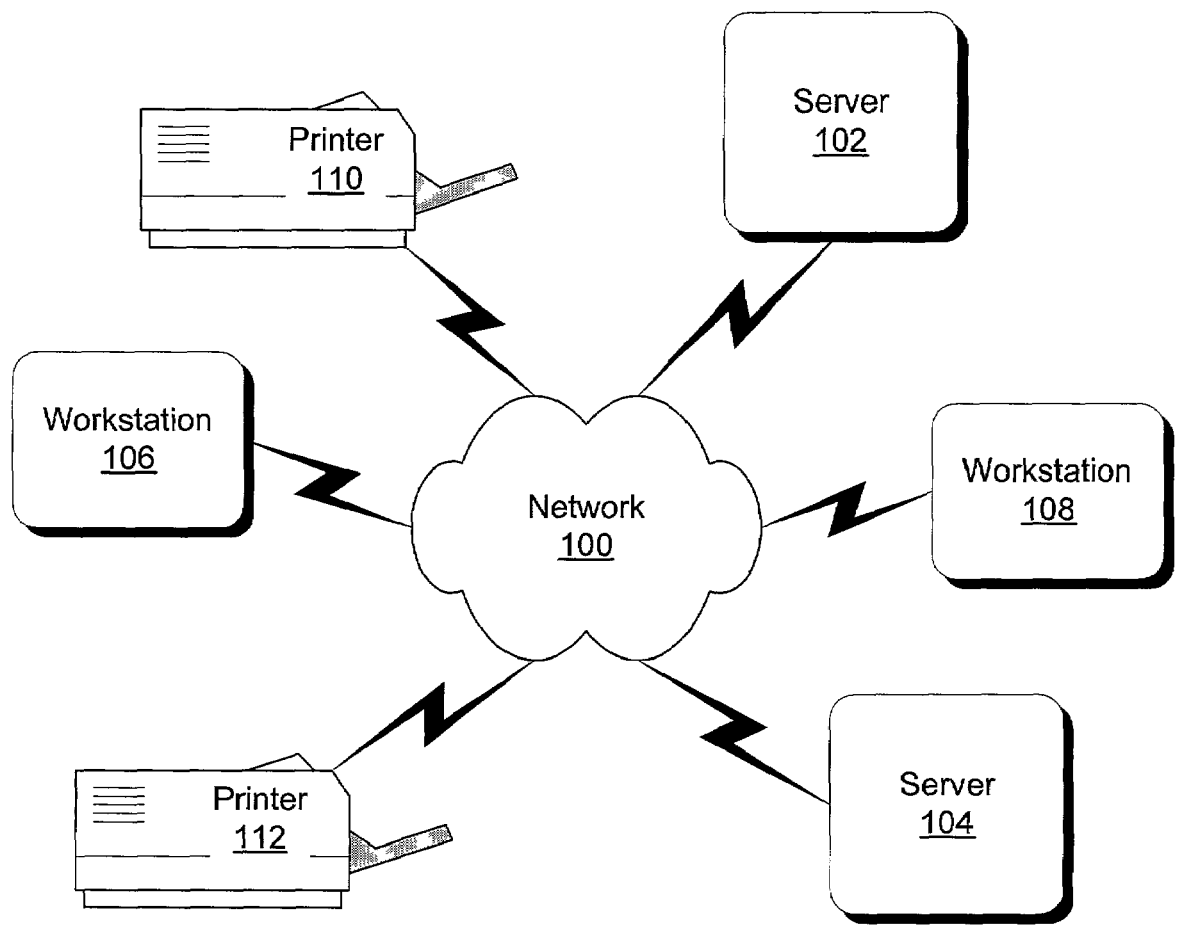
FIG. 1 illustrates a network environment in which multiple servers, workstations, and printers are coupled to one another via a data communication network.

FIG. 1 illustrates a network environment in which multiple servers, workstations, and printers are coupled to one another via a data communication network 100. The network 100 couples together servers 102, 104, computer workstations 106, 108, and printers 110, 112. The network 100 can be any type of network, such as a local area network (LAN) or a wide area network (WAN), using any type of network topology and any network communication protocol. The network may include wired, wireless or a combination of wired and wireless links. In a particular embodiment, the network 100 is the Internet. Although only a few devices are shown coupled to the network 100, a typical network may include tens or hundreds of devices coupled to one another. Furthermore, the network 100 may be coupled to one or more other networks, thereby providing coupling between a greater number of devices.

The servers 102, 104 may be file servers, email servers, database servers, print servers, or any other type of network server. The workstations 106, 108 can be any type of computing device, such as, but not limited to, a personal computer. Particular exemplary methods and/or systems include printers (e.g., such as the printers 110, 112) that are laser printers. Alternative exemplary methods and/or systems include, for example, ink-jet, bubble-jet or, in general, any type of printer. Furthermore, teachings presented herein optionally apply to any type of printing device, such as scanners, copiers and fax machines. Details of multifunctional devices and/or multifunctional printers appear below; some details of such devices and/or printers are known in the art. Although not shown in FIG. 1, one or more workstations and/or servers may contain a print rendering engine capable of converting raw print job information into a particular format (e.g., language) understood by certain types of printers. Where a system includes a printer menu, a printer menu editor application is optionally executed on a workstation 106, 108, or on a server 102, 104, to create or modify a printer menu structure.

Figure 2:
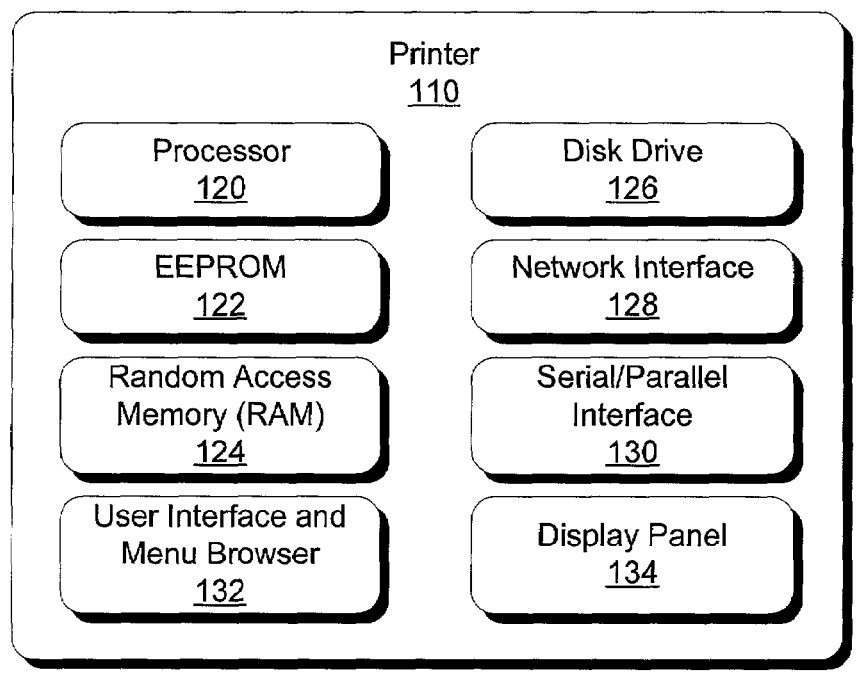
FIG. 2 is a block diagram showing pertinent components of a printer suitable for use with various exemplary systems and/or methods described herein.

FIG. 2 is a block diagram showing pertinent components of a printer 110 suitable (e.g., printer 110, 112 of FIG. 1) for use with various examples presented herein. As shown in FIG. 2, the printer 110 includes a processor 120, an electrically erasable programmable read-only memory (EEPROM) 122, and a random access memory (RAM) 124. The processor 120 processes various instructions necessary to operate the printer 110 and/or communicate with other devices. The EEPROM 122 and the RAM 124 store various information such as, but not limited to, configuration information, fonts, templates, data being printed, and menu structure information. Although not shown in FIG. 2, a particular printer may also contain a ROM (non-erasable) in place of or in addition to the EEPROM 122.

The exemplary printer 110, as shown in FIG. 2, also includes a disk drive 126, a network interface 128, and a serial/parallel interface 130. The disk drive 126 provides additional storage for data being printed or other information used by the printer 110. Although both the RAM 124 and the disk drive 126 are illustrated in FIG. 2, a particular printer may contain either a RAM 124 or a disk drive 126, depending on the storage needs of the printer. For example, an inexpensive printer may contain a small amount of RAM 124 and no disk drive 126, thereby reducing the manufacturing cost of the printer. The network interface 128 provides a connection between the printer 110 and a data communication network, such as the network 100. The network interface 128 allows devices coupled to a common data communication network to send print jobs, menu data, and other information to the printer 110 via a network (e.g., network 100 of FIG. 1). Similarly, the serial/parallel interface 130 provides a data communication path directly between the printer 110 and another device, such as a workstation, server, or other computing device. Although the printer 110 shown in FIG. 2 has two interfaces (the network interface 128 and the serial/parallel interface 130), an exemplary printer may include one interface or more than two interfaces.

As shown in FIG. 2, the exemplary printer 110 also contains a user interface/menu browser 132 and a display panel 134. The user interface 132 may include a series of buttons, switches or other indicators that are optionally usable by a user of the printer 110. The display panel 134 includes a graphical display that typically provides information regarding the status of the printer and the current options available through a menu structure. The printer 110 display panel 134 may display various menu options to a user of the printer 110. The display panel 134 and associated control buttons optionally allow a user of the printer to navigate a printer's menu structure.

Figure 3:
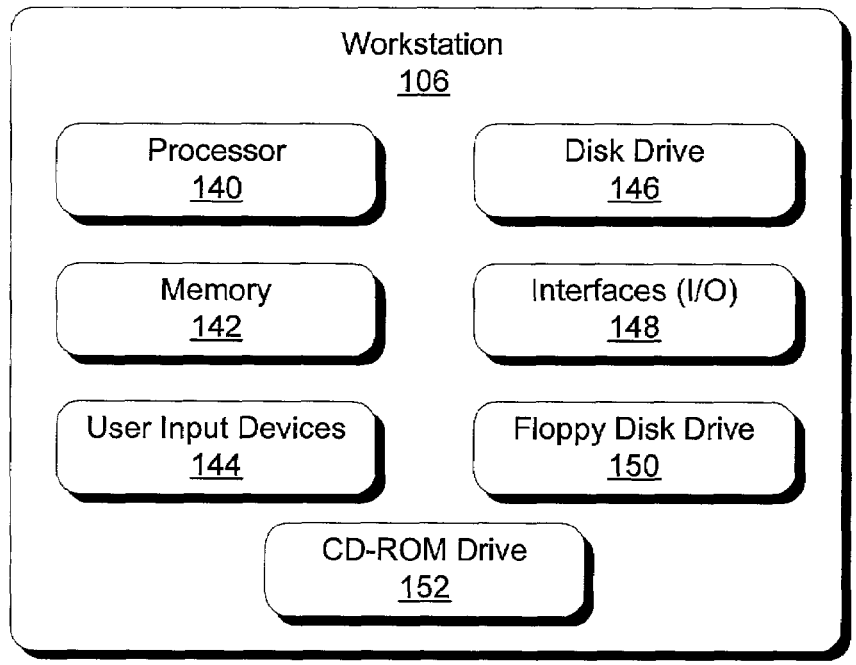
FIG. 3 is a block diagram showing pertinent components of a computer workstation suitable for use with various exemplary systems and/or methods described herein.

FIG. 3 is a block diagram showing pertinent components of a computer workstation 106 in accordance with exemplary methods and/or systems described herein. The workstation 106 includes a processor 140, a memory 142 (such as ROM and RAM), user input devices 144, a disk drive 146, interfaces 148 for inputting and outputting data, a floppy disk drive 150, and a CD-ROM drive 152. The processor 140 performs various instructions to control the operation of the workstation 106. The memory 142, the disk drive 146, the floppy disk drive 150, and the CD-ROM drive 152 provide data storage mechanisms. The user input devices 144 include a keyboard, mouse, pointing device, or other mechanism for inputting information to the workstation 106. The interfaces 148 provide a mechanism for the workstation 106 to communicate with other devices. A server (e.g., servers 102, 104 of FIG. 1), typically includes at least some of the workstation 106 features.

Various printers described herein have printer specific software (or firmware) and software (or firmware) for all paper handling and/or print associated devices (e.g., scanners, finishing units, etc.). Printers having multiple functions are sometimes referred to herein as multifunctional printers (MFPs) which are within the class of multifunctional devices (MFDs). As the name implies, a MFD is a device capable of performing multiple functions. Regarding printers, most functions relate to printing, paper handling, and/or data communication. Examples of the functions performed by a MFD include, but are not limited to: printing; multi-orig-out-ing (sometimes referred to, or including, mopy printing); copying; sending/receiving fax; sending/receiving e-mail; image acquisition; text recognition; source paper handling (such as high capacity input (HCI), trays having differing paper sizes/types, envelope trays, etc.); destination paper handling (such as stacking, stapling, sorting, collating, mailboxes, etc.); and data acquisition (network, serial, USB, wireless, parallel, floppy disk, hard disk, RAM, flash cards, etc.).

An exemplary function, as listed above, is mopy printing. Mopy-enabled printers utilize intelligent software (or firmware) and host software to improve throughput and reduce or eliminate various issues. In mopy printing, a printer driver typically transmits a file only once and sends appropriate header information (e.g., the number of copies) to the printer for rasterization and spooling. In general, the printer rasterizes the job only once and then prints multiple, original copies in the manner determined by a user. Mopy printing is particularly useful for complex jobs that slow down the printer when the first copy is created or takes a long time to transmit over a network.

Commercially available printers having multiple functionality include the Hewlett Packard (HP) LASERJET® 9000 printers (Palo Alto, Calif.). Such MFPs are based on installation of software and/or hardware solutions in new or existing printers. In particular, such MFPs optionally include e-enabled print management features which may perform the following management tasks: install printers, configure printer options, configure and install multiple printers at one time, troubleshoot printer problems, schedule discoveries to update the device cache during off-peak hours, search for a specific printer or group of printers based on a wide variety of criteria, check a printer's current status, check the status of a printer's consumables, verify the type of media loaded in a printer's trays, verify a printer's capabilities, organize printers by logical groups, and create a virtual office layout with dynamic site maps.

Such MFPs address issues related to the variety and volume of transactions in today's business. In particular, an MFP may eliminate the need for a dedicated specialized high volume printer for each type of transaction document. As referred to herein, the term "transaction printing" is an industry standard term that refers to a scheduled batch print jobs with a copy count of one. Normally these jobs are generated from a mainframe or from an NT® operating system server (Microsoft Corporation, Redmond, Wash.) or UNIX® operating system server (UNIX System Laboratories, Inc., Basking Ridge, N.J.). Typical output examples include invoices, statements, payroll, purchase orders, accounts receivable, etc.

Additional MFP features may include: browser-compatible printer management software having an embedded web server and administration software (e.g, HP WEB JETADMIN®) to deliver remote printer management services and solutions for one-to-one and one-to-many printer management; Internet software that may include easy custom Internet software disk replication utility to customize what options administrators will load to their systems; administration software for easy intranet administration; Internet installer software for easy downloading and updating of software; software utility software to let a user or an administrator know when updates are available; Internet page set up utility software to format and print internet pages, and to poll the internet for addresses that a user (or device) has requested as well as schedule the printing of those selected pages at any specified interval or intervals.

An MFP may also have an ability to send automatic e-mail alerts, and be optionally configured to send preconfigured notifications of printer problems and job status via e-mail to designated recipients on the network. An e-mail notice may even provide a hot link for ordering supplies via the Internet.

An MFP may further include smart components. For example, a print supplies system may be activated upon installation of a smart print cartridge in a printer. Each smart print cartridge may feature its own chip which may help to measure and report toner levels, provide usage information, assure job completion, etc. In such an MFP, the cartridge, printer, and software optionally (and typically) work cooperatively.

In general, a MFD (e.g., a MFP) includes multiple parts that rely on software. Such parts include, but are not limited to: formatters, paper-handling devices, copy processor boards, etc. These parts operate in conjunction with firmware/software that may be subject to revision or upgrades. As described herein, such upgrades may be performed remotely. Prior to the existence of such MFPs, issues associated with part compatibility were virtually nonexistent.

As described herein, an exemplary method of bundled upgrading helps to assure part-to-part operational compatibility. In this method, upgrading of software on a wholly part-by-part basis is disabled and instead, all upgradeable (or revisable) software is upgraded (or revised) through use of a software bundle. According to this method, each software component of the software bundle has a guarantee of known compatibility. For example, when a new software upgrade for a part becomes available it is qualified with existing software upgrades for other parts of a MFP. In an exemplary upgrade method, once a new software upgrade has passed a qualification procedure, a new software bundle is created comprising the new software upgrade (or upgrades) and other qualified existing software.

Software components suitable for inclusion in a software bundle optionally include a "printer driver", a software program that enables other programs to work with a particular printer without concern for specifics of the printer's hardware and internal language. In general, a printer requires a specific set of codes and commands to operate properly and to provide access to special features and abilities. Other multifunctional devices generally have a device driver (i.e., software component) that provides for similar functionality.

Network administrators within an organization typically use one or more device management applications to manage peripheral devices within an organizational or corporate intranet. A peripheral device is any device that can be connected to a computer or network such as a printer, copier, scanner, fax machine, data storage system, lab equipment, a home entertainment device, and the like. HP JETADMIN® and HP WEB JETADMIN® products are exemplary peripheral device management applications that may be used by network administrators to discover, install, monitor and troubleshoot network-connected peripherals (or devices), such as printers, in an intranet.

Figure 4:
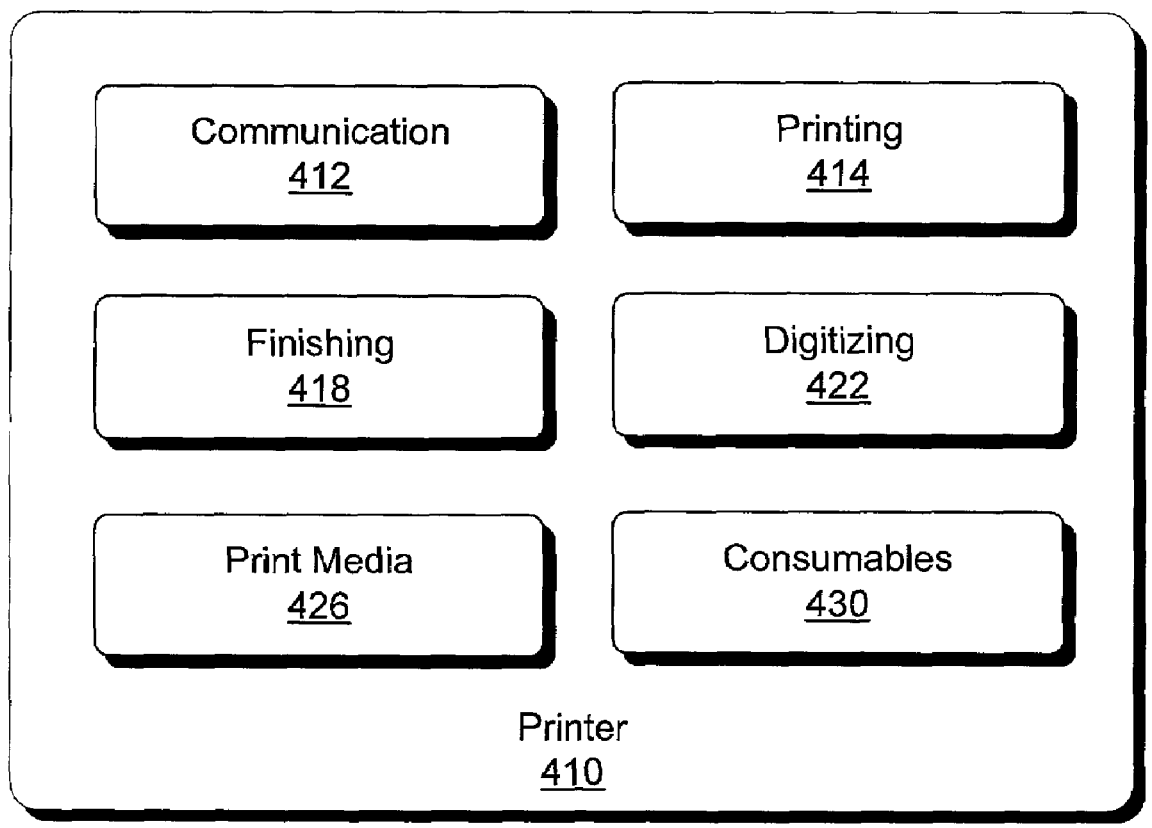
FIG. 4 is a block diagram of an exemplary multifunctional printer showing various functional blocks.

Referring to FIG. 4, a block diagram of an exemplary multifunctional printer 410 is shown (see also printer 110, 112 FIG. 1 and FIG. 2). As shown, printer 410 includes a variety of functional blocks which have associated software. Such software optionally operates in conjunction with features of the printer 110 shown in FIG. 1 and FIG. 2 (e.g., processor 120, RAM 124, etc.).

A communication block 412 includes software for various communication operations. Communication software includes, but is not limited to, Web server software capable of hosting Web pages. Such Web pages optionally provide information on printer status, printer configuration, event logs, supplies, usage, network settings, administrative control, diagnostics, other devices, etc. For example, a device Web page hosted on a printer Web server may allow a user to configure a printer (or printers) from a printer or a computer. Commercially available software includes HP WEB JETADMIN® software, which is a Web browser-based management tool for proactive management and configuration of network-connected peripherals. When embedded in a printer, such software (or an equivalent thereof) may allow for remote installations, configurations, diagnostics, and print management for a plurality of network peripherals from a common Web browser, which is optionally located on a printer. Other software associated with Web browser and/or Web server software includes, but is not limited to, virtual machine software (e.g., HP CHAI® virtual machine, Sun Microsystems, Inc. JAVA® virtual machine, etc.). Additional communication software may perform e-mail operations and the like.

A printing block 414 includes software for various printing operations. For example, the printer 410 may include a duplex unit for duplexing print media, thereby allowing for two-sided printing. Thus, a printing block 414 optionally includes software for duplex operations in addition to software for other printing operations. A finishing block 418 includes software for various finishing operations. For example, the printer 410 may include a finishing unit such as a sheet stacker and/or a sheet stapler/stacker for stacking and/or stapling printed media. Such finishing units may increase printer output capacity, separate printed media (e.g., based on job, etc.), and/or fix (e.g., staple, etc.) selected printed media.

A digitizing block 422 includes software related to digital representation of a print image. Further details of an exemplary digitizing block appear below with reference with to FIG. 6. Other functional blocks, whether or not illustrated in FIG. 4, may also include sub-blocks. A print media block 426 includes software for print media access operations. For example, the printer 410 may include a print media supply unit for supplying print media. A consumables block 430 includes software for monitoring and/or controlling consumables. For example, the printer 410 may include sensors for sensing ink or toner levels. The printer 410 may also include a smart toner cartridge. A smart toner cartridge includes an integrated circuit chip or processor to help in sensing, monitoring, and/or reporting toner levels and/or other information. According to the exemplary printer 410, a smart cartridge operates cooperatively with consumable block 430 software. Other printer-related components (e.g., finishing units, media units, etc.) may also include an integrated circuit chip or processor; such components are referred to herein as "smart" components.

Figure 5:
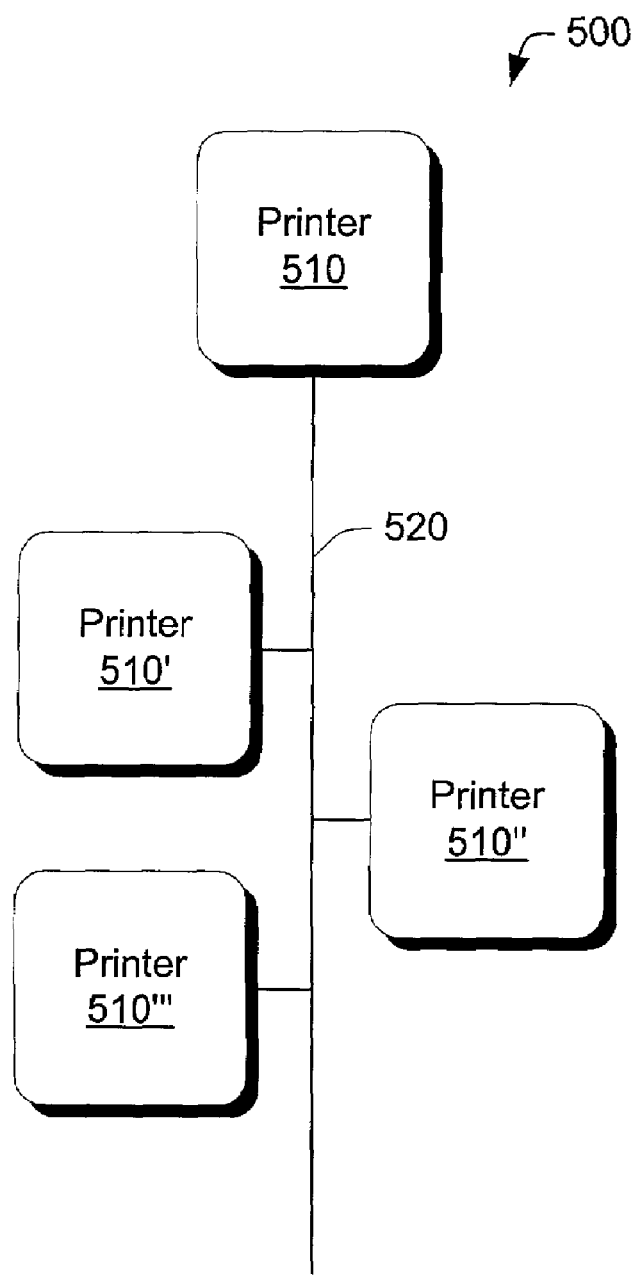
FIG. 5 is a block diagram showing a group of printers having at least one wired or wireless communication link.

Referring to FIG. 5, a cluster of printers 500 (510, 510', 510", 510'") is shown. In such an arrangement, one printer (e.g., 510) may download software to other printers (e.g., 510', 510", 510'") or a computer may download software to a plurality of printers on a network. As shown in FIG. 5, the cluster 500 includes a communication link 520, which optionally includes wired and/or wireless technologies. One or more of the printers in the cluster of printers 500 optionally include features of the exemplary printer 410, as shown in FIG. 4.

Figure 6:
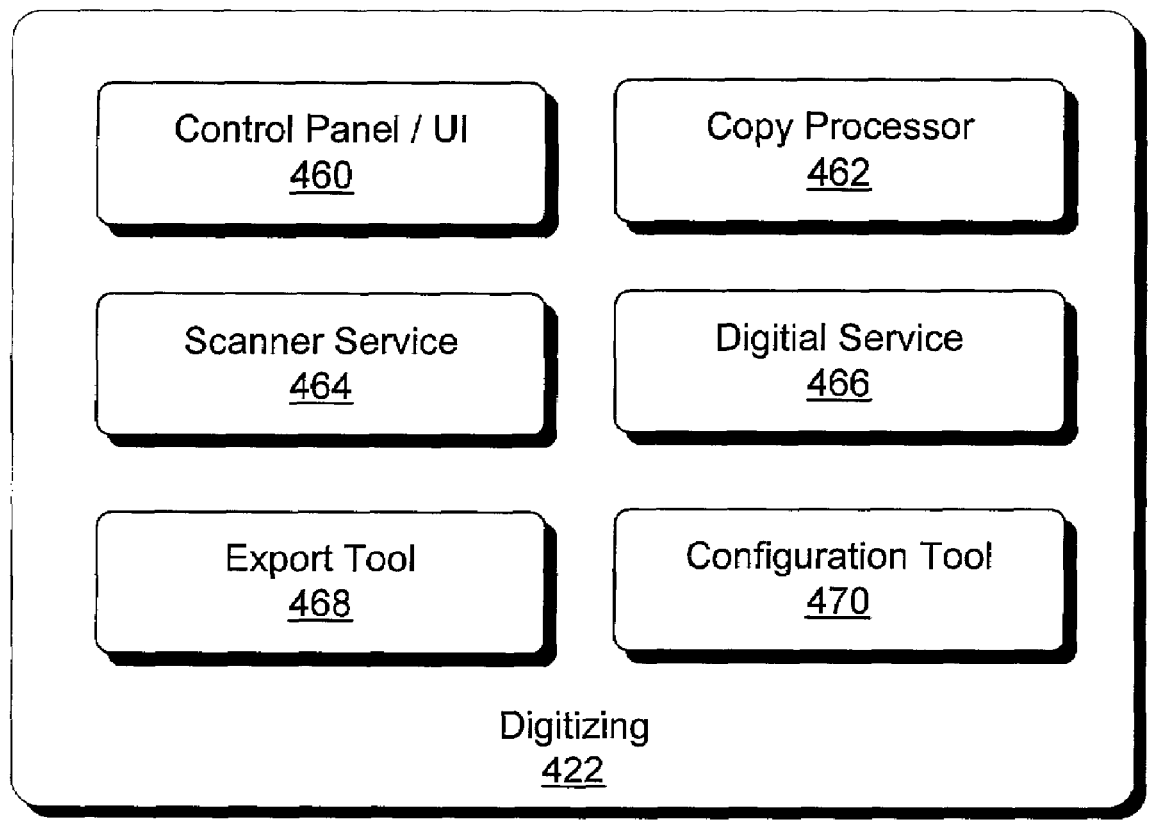
FIG. 6 is a functional block diagram showing various sub-blocks.

Referring to FIG. 6, an exemplary digitizing block 422 is shown having various sub-blocks. A control panel/user interface sub-block 460 includes software for managing a user interface and/or general print job control. A copy processor sub-block 462 includes software for generating selected data file formats. A scanner service sub-block 464 includes software for scanner services, such as, but not limited to, a scanner service agent. A digital service sub-block 466 includes software for digital services, such as, but not limited to, a service that allows mobile device users to communicate with a printer without use of a separate server or other host. An export tool sub-block 468 includes software for export of information related to print jobs. For example, an export tool sub-block 468 may include software for updating address books from a Lightweight Directory Access Protocol (LDAP) server in an automated fashion. A configuration tool sub-block 470 includes software for configuring the digitizing block 422. This sub-block 470 optionally includes various configuration utilities. Commercially available software such as the HP Digital Sender Module includes some features of the exemplary digitizing block 422.

Figure 7:
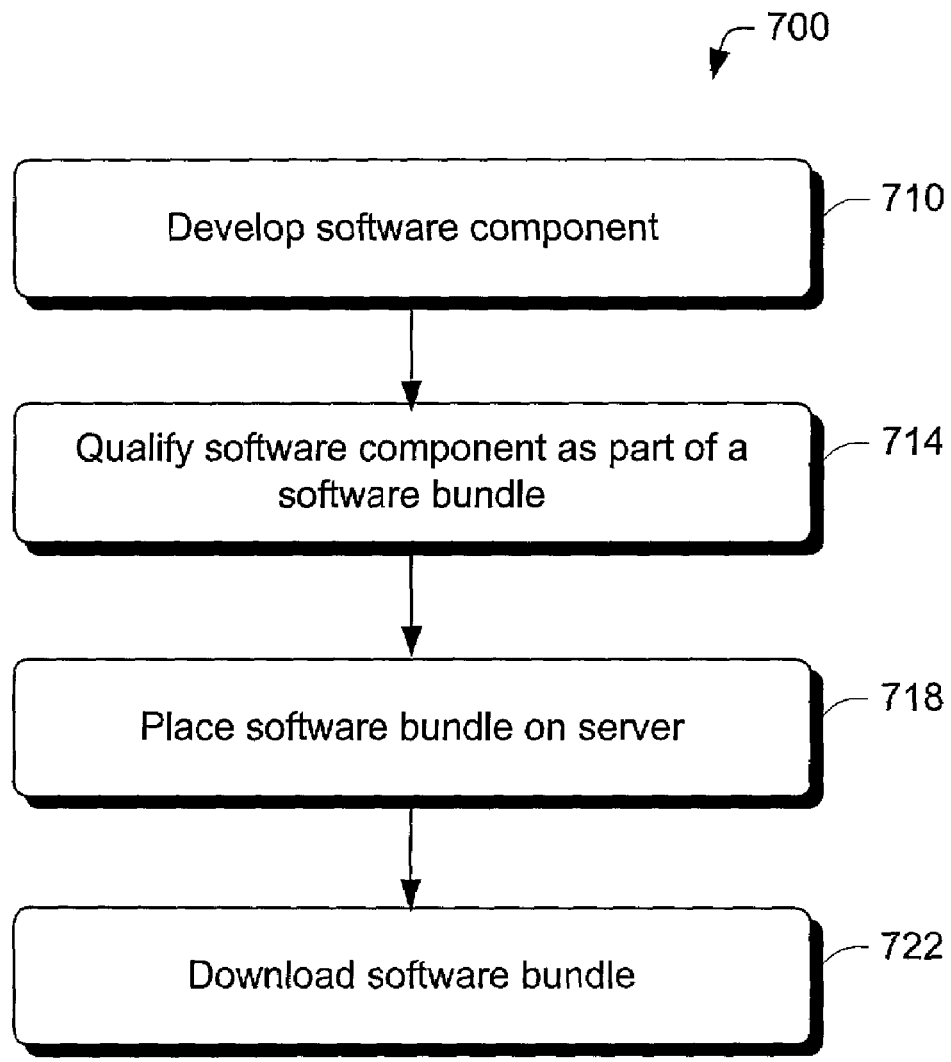
FIG. 7 is a block diagram illustrating an exemplary method for revising software.

Referring to FIG. 7, an exemplary method for software revision 700 is shown. In a development block 710, a developer (human and/or machine) develops and/or revises a software component for a particular part of a multifunctional device. Next, in a qualification block 714, the software component is qualified (by human and/or machine) in conjunction with another software component (or components) associated with another part (or parts) of the multifunctional device. In the qualification block 714, the revised (or new) software component is combined (by human and/or machine) with at least one other software component to form a software bundle. After qualification, in a placement block 718, the software bundle is placed and/or otherwise made available (e.g., to end-users, administrators, and/or directly to devices). For example, the placement block 718 involves placing the software bundle on a server. Placing optionally includes loading; however, placing may also include linking. In a download block 722, an end-user, administrator, and/or device downloads the software bundle. This exemplary method 700 can eliminate the need to download (or load) individual software components of questionable compatibility. The bundled approach of this exemplary method 700 lends an added assurance of compatibility.

Figure 8:
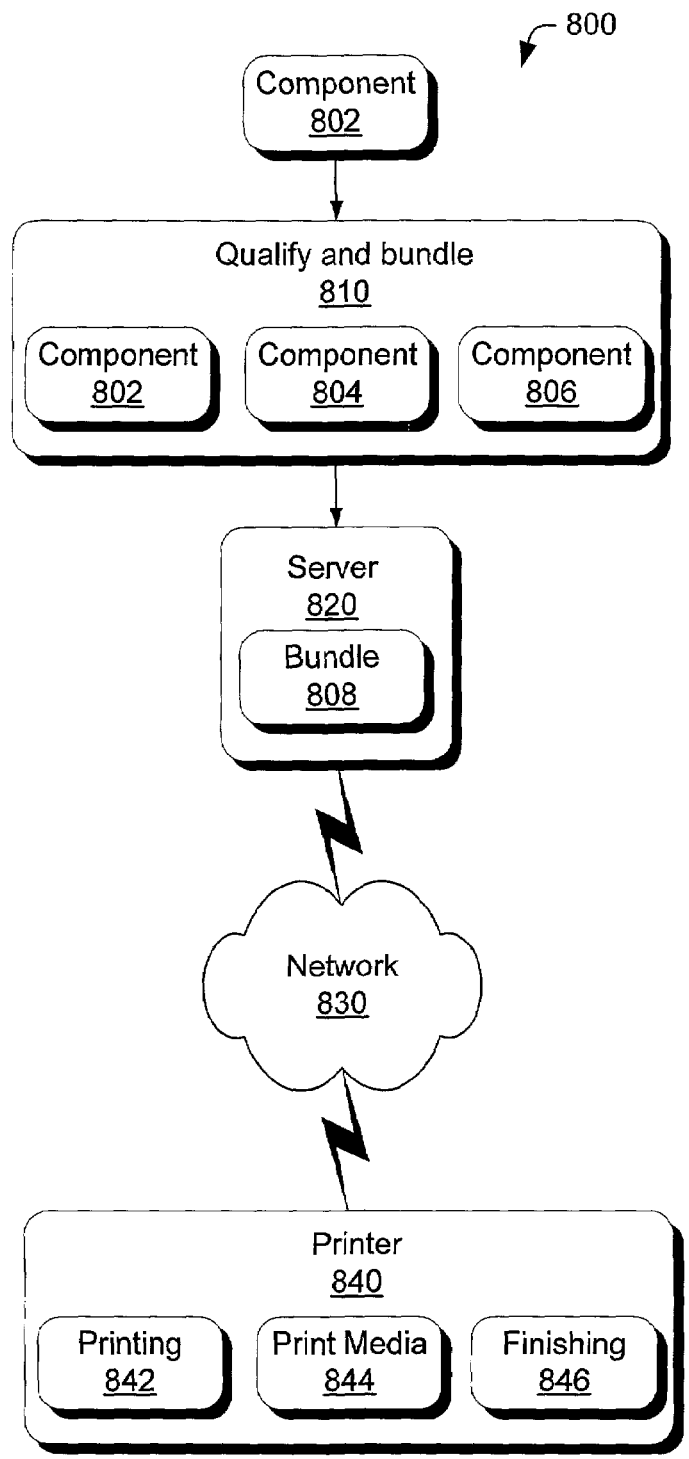
FIG. 8 is a block diagram illustrating an exemplary method for revising software.

Referring to FIG. 8, an exemplary method for software revision 800 is shown. In a development block (e.g. block 710 of FIG. 7), a developer (human and/or machine) develops a software component 802, such as, a software component for executing a printing operation. Next, in a qualification block (e.g., block 714 of FIG. 7), the software component 802 is qualified (by human and/or machine) along with additional software components 804, 806. The additional components 804, 806 optionally include components for executing operations related to print media and/or finishing. The software components 802, 804, 806 are bundled (e.g., in a qualification and/or separate bundling block) to form a software bundle 808, which typically exists as a single file. In a placement block (e.g., block 718 of FIG. 7), the software bundle 808 is placed and/or otherwise made available on a server 820. For example, the placement block (e.g., block 718 of FIG. 7) involves placing the software bundle 808 on the server 820. Placing optionally includes loading; however, placing may also include linking.

In this exemplary method 800, a download block (e.g., block 722 of FIG. 7) associated with a multifunctional printer 840 downloads the software bundle 808. Upon downloading, e.g., via a network 830, the software bundle 808 resides in printer memory (see, e.g., printer 110 of FIG. 2). As shown in FIG. 8, the multifunctional printer 840 includes a functional printing block 842, a functional print media block 844 and a functional print finishing block 846. In this example, these three blocks have associated printing, print media and print finishing parts. Once the software bundle 808 resides in printer memory, a processor and associated software may aid in the unbundling of the various software components 802, 804, 806 (see, e.g., printer 110 of FIG. 2). The unbundled components 802, 804, 806 then work in conjunction with the appropriate functional parts.

More specifically, in the exemplary method 800 (shown in FIG. 8), the printing software component may include revised software for an event related to "ready" and/or "offline" status, the print media software component may include revised software for an event related to the size of a print media tray, and the print finishing software component may include revised software for an event related to a staple supply.

In addition, the software bundle 808 optionally comprises a single file having a specific file extension (e.g., ".RFU"). Upon downloading of a software bundle 808, in the case of pending print jobs or other tasks, the printer may suspend such tasks or allow for execution of tasks prior to initiating revision to printer software.

An exemplary multifunctional printer and/or multifunctional device suitable for use with various exemplary methods, includes an input (e.g., network interface, disk drive, etc.) for receiving a software bundle (e.g., having a specific file extension) wherein the software bundle includes software components for at least two printer/device parts and a processor configured (e.g., through software) to distinguish each of the software components included in the software bundle. Such a processor may also adjust task and/or job priorities to upgrade (or revise) software at a suitable time.

In yet another exemplary method of revising printer software, an administrator initiates execution of Web administration software (e.g., HP WEB JETADMIN®). Next, the administrator enters an IP address or IP hostname of a printer in a device find field. Once found, the administration software displays a status window for the printer. In conjunction with the status window, the administrative software also displays an "update" icon or button. Activation of the update button results in a display of further information related to the type of update to perform (e.g., update printers). Selection of an "update printers" option causes the administrative software to display an icon or button for uploading of new (or revised) printer software and a browse option to aid in locating an already downloaded software bundle, typically downloaded from a printer manufacturer's Web site. Activation of the icon or button for uploading new (or revised) printer software moves or copies the software bundle from a local storage site to a Web server (e.g., a HP WEB JETADMIN® server). Next, the administrator may refresh the Web browser and select the software bundle file from a menu or the like. Activation of an update software icon or button then causes the administrative software to send the software bundle to a printer needing new or revised software.

Another exemplary method includes using administrative software to revise printer software for a plurality of printers. According to this method, an administrator initiates execution of administrative software (e.g., HP WEB JETADMIN®). Next, the administrator creates a device group, in part, by selecting printers from a list for inclusion in the group. The administrator may update software for printers in this group by activating an "update" icon or button displayed by the administrative software and optionally selecting all or only some of the printers in the group. Exemplary methods described herein, optionally display, send and/or print (automatically and/or manually) information related to a software revision. For example, a printer may transmit (display, send, print, etc.) configuration information verifying a successful revision. In the case of a software failure, a printer may optionally use a stored ship-time version of printer software. Such a stored version may be stored, for example, on a backup partition of a printer's flash DIMM.

In general, the elapsed time for a revision may depend on an I/O transfer time as well as the time that it takes for a printer to reinitialize, which may be required in response to software revision (reinitialization may occur automatically or manually). The I/O transfer time normally depends on factors such as speed of server (or host) making bundle available and the I/O method (fast infrared, parallel, network, etc.). Reinitialization time may depend on factors such as the number of EIO devices installed, the presence of paper handling devices, and the amount of memory installed in the printer.

While various methods described herein refer to multifunctional printers, such methods also optionally apply to multifunctional devices. Various operations described with reference to the exemplary methods are generally performed by a human and/or a machine.

Although various exemplary methods and/or systems have been described in language specific to structural features and/or methodological blocks, it is to be understood that the content of the appended claims is not necessarily limited to the specific features or blocks described. Rather, the specific features and blocks are disclosed as preferred forms of implementing the claimed content.

The invention claimed is:

1. A method of revising software in a group of multifunctional printers, comprising:

revising a revisable software component for a part of at least one printer of the group of multifunctional printers;

providing all other revisable software components for parts of at least one printer of the group of multifunctional printers;

qualifying the revised software component in conjunction with all of the other revisable software components;

bundling the software components as a software bundle wherein the software components comprise the qualified, revised software component;

searching and locating the software bundles that represent updated software components for each multifunction printer via a web based graphical user interface;

loading the software bundle on to plural user selected multifunctional printers; and placing the bundle on a server and wherein the server comprises the multifunctional printer.

2. The method of claim 1 wherein the software bundle comprises a single file.

3. The method of claim 2 wherein the file has an extension associated with software bundles.

4. The method of claim 1 wherein the software bundle comprises at least one software component selected from the group consisting of print media software and print finishing software.

5. The method of claim 1 further comprising executing administrative software to assist in the loading.

6. The method of claim 1 wherein the multifunctional printer comprises a smart print cartridge that operates cooperatively with at least one software component of the software bundle.

7. The method of claim 1 further comprising transmitting information related to the qualified, revised software component prior to, during and/or after the loading.

8. The method of claim 1 further comprising completing a pending task prior to the loading.

9. A computer-readable medium storing computer-executable instructions to search and locate software bundles that represent respective updated software components for a group of multifunction printers using a web based graphical user interface and subsequently load the software bundles on to user selected multifunctional printers wherein the software bundles comprise a plurality of revisable software components for parts of the multifunctional printer and a qualified, revised software component for a part of the multifunctional printers, the qualified, revised software component qualified in conjunction with the plurality of revisable software components and placing the bundle on a server and wherein the server comprises the multifunctional printer.

10. The computer-readable medium of claim 9 further comprising instructions to initialize a multifunctional printer.

11. The computer-readable medium of claim 9 further comprising instructions to transmit information related to loading a software bundle on a multifunctional printer.

12. A method of revising software in a group of multifunctional printers, comprising searching and locating, via a web based graphical user interface, software bundles that represent respective updated software components for each multifunction printer and subsequently loading the software on to user selected multifunctional printers in the form of updated software bundles wherein the software bundles comprises a plurality of revisable software components for parts of the multifunctional printers and a qualified, revised software component for a part of the multifunctional printers, the qualified, revised software component qualified in conjunction with the plurality of revisable software components and placing the bundle on a server and wherein the server comprises the multifunctional printer.

13. The method of claim 12 wherein the software bundle comprises a single file.

14. The method of claim 13 wherein the file has an extension associated with software bundles.

15. The method of claim 12 wherein the software bundle comprises at least one software component selected from the group consisting of print media software and print finishing software.

16. The method of claim 12 further comprising executing administrative software to assist in the loading.

17. The method of claim 12 wherein the multifunctional printer comprises a smart print cartridge that operates cooperatively with at least one software component of the software bundle.

18. The method of claim 12 further comprising transmitting information related to the qualified, revised software component revision prior to, during and/or after the loading.

19. The method of claim 12 further comprising completing a pending task prior to the loading.

20. A method of revising software in a group of multifunctional devices, comprising:

revising at least one revisable software component of multi-component software;

providing all other revisable software components of the group of multifunctional devices;

qualifying the at least one revisable software component in conjunction with all of the other revisable software components;

bundling the software components as software bundles wherein the software components comprise the qualified, revised software component;

searching and locating the software bundles via a web based graphical user interface that represents updated software components for each respective multifunctional device;

loading the software bundle on to user selected multifunctional devices and placing the bundle on a server and wherein the server comprises the multifunctional printer.

21. The method of claim 20 further comprising placing the bundle on a server.

22. The method of claim 21 wherein the server comprises the multifunctional device.

23. A computer-readable medium storing computer-executable instructions to use a World Wide Web graphical user interface to search and locate software bundles that represent updated software components for each multifunction device in a group of multifunction devices and subsequently loading updated software components of the software bundles on to user selected multifunctional devices that need the updates wherein the software bundles comprise a plurality of revisable software components for parts of the multifunctional devices and a qualified, revised software component for a part of the multifunctional devices, the qualified, revised software component qualified in conjunction with the plurality of revisable software components and placing the bundle on a server and wherein the server comprises the multifunctional printer.

24. The computer-readable medium of claim 23 further comprising instructions to initialize a multifunctional device.

25. The computer-readable medium of claim 23 further comprising instructions to transmit information related to loading a software bundle on a multifunctional device.

26. A multifunctional printer comprising:
a graphical user interface for searching and locating a software bundle that represents updated software components for the multifunctional printer, wherein the graphical user interface allows a user to selectively update the printer parts;
an input for receiving the software bundle wherein the software bundle includes revisable software components for at least two printer parts wherein at least one of the revisable software components comprises a qualified, revised software component qualified in conjunction with the other revisable software components; and
a processor configured to distinguish each of the software components included in the software bundle and for placing the bundle on a server and wherein the server comprises the multifunctional printer.

27. The multifunctional printer of claim 26 wherein the input receives the software bundle via a network.

28. The multifunctional printer of claim 26 further comprising a Web browser.

29. The multifunctional printer of claim 26 wherein one of the at least two printer parts comprises a scanner.

30. The multifunctional printer of claim 26 wherein one of the at least two printer parts comprises a stacker.

31. The multifunctional printer of claim 26 wherein the processor is configured to recognize a file extension associated with a software bundle.

32. A multifunctional printer having software components, comprising:
revision means for revising at least one software component for a part of the multifunctional printer;
qualification means for qualifying the at least one revised software component wherein the qualifying qualifies the at least one revised software component in conjunction with one or more other revisable software components of the multifunctional printer;
bundle means for bundling the software components as a software bundle wherein the software components comprises the at least one revised, qualified software component;
search and locate means for searching and locating, via a graphical user interface, the software components of the software bundle that represents updated information for the multifunction printer for selectively updating predefined components of the multifunctional printer; and
load means for loading the software bundle on another multifunctional printer.

* * * * *